(12) United States Patent
Mueller et al.

(10) Patent No.: US 7,577,682 B2
(45) Date of Patent: Aug. 18, 2009

(54) SEMANTIC OBJECTS

(75) Inventors: Stefan Mueller, Sinsheim (DE);
Christoph Thommes, Heidelberg (DE);
Marcus Schwarz, Lampertheim (DE);
Stephan Klevenz, Heidelberg (DE)

(73) Assignee: SAP AG, Walldorf (DE)

( * ) Notice: Subject to any disclaimer, the term of this patent is extended or adjusted under 35 U.S.C. 154(b) by 458 days.

(21) Appl. No.: 10/632,120

(22) Filed: Jul. 31, 2003

(65) Prior Publication Data
US 2005/0027708 A1 Feb. 3, 2005

(51) Int. Cl.
*G06F 17/00* (2006.01)
(52) U.S. Cl. .................... 707/104.1; 707/10
(58) Field of Classification Search .............. 707/1–10, 707/3
See application file for complete search history.

(56) References Cited

U.S. PATENT DOCUMENTS

| | | | | |
|---|---|---|---|---|
| 5,694,598 A | * | 12/1997 | Durand et al. | 707/103 R |
| 6,061,515 A | * | 5/2000 | Chang et al. | 717/114 |
| 6,175,828 B1 | * | 1/2001 | Kuromusha et al. | 707/3 |
| 6,460,043 B1 | * | 10/2002 | Tabbara et al. | 707/100 |
| 2004/0260749 A1 | * | 12/2004 | Trossen et al. | 709/200 |
| 2006/0026113 A1 | * | 2/2006 | Omoigui | 706/55 |

FOREIGN PATENT DOCUMENTS

WO    WO 00/75849    12/2000

OTHER PUBLICATIONS

Bloesch, et al., "ConQuer: A Conceptual Query Language" 1996 Proc. ER'96: 15$^{th}$ Int. Conf. on conceptual modeling, Springer LNCS, No. 1157, pp. 121-133.

* cited by examiner

*Primary Examiner*—Sathyanarayan Pannala
(74) *Attorney, Agent, or Firm*—Mintz, Levin, Cohn, Ferris, Glovsky & Popeo, P.C.

(57) ABSTRACT

A computer-implemented method of providing access to information stored in diverse formats comprises receiving from an application a semantic request having a request name that semantically identifies a type of information sought by the request, converting the received semantic request to a generic request having corresponding request parameters, transmitting the converted request to a data access system, receiving data from the data access system corresponding to the converted request, and providing the data to the application.

10 Claims, 6 Drawing Sheets

SEMANTIC OBJECTS

BACKGROUND

The following description relates to programming objects that provide for intuitive development of enterprise resource planning systems.

Enterprise resource planning (ERP) systems are generally integrated computer systems that manage multiple functions within an organization, such as human resources, manufacturing, customer relationships, supplier relationships, sales force automation, project management, product life-cycle management, and the like. ERP systems can contain an almost endless array of information. For example, information may be stored in a highly-organized format, such as a flat-file database. This type of information could include information about members of the organization (e.g., employees), such as names, employee numbers, starting work date, and accrued vacation time. Information may also be stored in a less-organized format, e.g., as word processing documents, images, spreadsheets, text files, or audio files. This diverse range of information types can create real challenges for developers working to implement an ERP system in a manner that is intuitive and easy-to-use.

Most organizations are also unable to set up an entire ERP system at one time. Rather, such systems typically grow and morph over time as the organization makes decisions about new software purchases (decisions that might be made without coordination from department-to-department or division-to-division), or acquires new pieces of the organization (such as through mergers with, or purchases of, other organizations that have their own current computer systems). As a result, a large organization will often have many databases that store similar information in different organizational formats. In addition, the databases may be provided by different companies, and thus use different protocols for accessing the information. These differences bring even greater variation to the data that developers must provide to users of a system.

Tools are available that assist developers in taming this mass of information stored in different formats on different systems. For example, various abstraction layers may be provided to translate information requests into the appropriate protocol for various data storage systems, such as those provided by Oracle, IBM, Informix, Sybase, and Microsoft, and systems that follow various models such as the LDAP model, X.500, and other, proprietary database models. These layers help simplify data access for a developer to some extent. Still, further simplification of access to data may be preferred in particular situations. In particular, it is helpful to better integrate any back-end data storage systems with the user interface that is prepared by a developer of a computer system.

SUMMARY

This document discloses a computer-implemented method and system that provides simplified access to data stored in an organization's computer system. The method comprises receiving from an application a semantic request having a request name that semantically identifies a type of information sought by the request, converting the received semantic request to a generic request having corresponding request parameters, transmitting the converted request to a data access system, receiving data from the data access system corresponding to the converted request, and providing the data to the application. The method may also comprise typecasting the data received form the data access system before providing the data to the application. In addition, if a database connection has not yet been opened, an object for receiving and converting the semantic request may be created, a database connection corresponding to the semantic request may be opened, and properties of data corresponding to the semantic request may be requested.

The semantic request may comprise a uniform resource identifier, and the object may be a group object configured to access information about groups of entities. The created object may request the properties of a resource corresponding to the converted request, and the converted request may comprise parameters corresponding to, but not present in, the semantic request.

In another embodiment, a computer-implemented method for establishing an object for simplifying data access is provided. The method comprises identifying a generic data access command for communicating with a data access system, creating a semantic data access command that corresponds to the generic data access command, providing a semantic object configured to receive the semantic data access command from an application, and providing a corresponding generic data access command to a data access system. The semantic data access command may comprise a uniform resource identifier, and the generic data access command may comprise parameters corresponding to, but not present in, the semantic data access command. Also, if a database connection has not previously been opened, the semantic object may open a database connection corresponding to the semantic data access command and request properties of data corresponding to the semantic data access command.

In another embodiment, a system for providing simplified access to data stored in diverse formats is described. The system may comprise a plurality of user applications configured to receive requests from, and present data to, one or more users of the system, a semantic object that is accessible by one or more of the user applications using a name that semantically suggests the action to be performed by the semantic object, and a repository system that receives the generic data request and responds to the semantic object with data corresponding to the request. The semantic object may produce in response to a request from the one or more user applications, a generic data request having one or more parameters that convey information relating to the request. The semantic object may also type cast the data corresponding to the request to the user application. A semantic object provider configured to give access to prepared semantic objects in response to a request from a user application may also be provided. The provider may accept additional semantic objects after the system has been established, and may be configured to access semantic objects over a remote communication link. The system may also comprise a portal that provides access to the user applications.

In another embodiment, an article comprising a machine-readable medium storing instructions operable to cause one or more machines to perform operations is provided. The operations may include receiving from an application a semantic request having a request name that semantically identifies a type of information sought by the request, converting the received semantic request to a generic request having corresponding request parameters, transmitting the converted request to a data access system, receiving data from the data access system corresponding to the converted request, and providing the data to the application. Instructions operable to cause one or more machines to typecast the data received from the data access system before providing the data to the application may also be provided. The semantic request may comprise a uniform resource identifier. If a database connection has not previously been opened, instructions may be provided that are operable to create an object for receiving and converting the semantic request, open a database connection corresponding to the semantic request, and request properties of data corresponding to the semantic request. The object may be a group object configured to access information about groups of of entities, and the created object may request the properties of a resource corresponding to the converted request. The converted request may also comprise parameters corresponding to, but not present in, the semantic request.

Advantageously, the method and system may provide an effective means by which a developer can produce code for a particular system in a simplified manner and by using less time. In addition, a user may be provided with data in a way that requires fewer programming steps, and does not require the developer to understand the back-end system where the data is stored.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to enabling a computer software developer to access persistently stored data in a simpler and more convenient manner.

Figure 1:
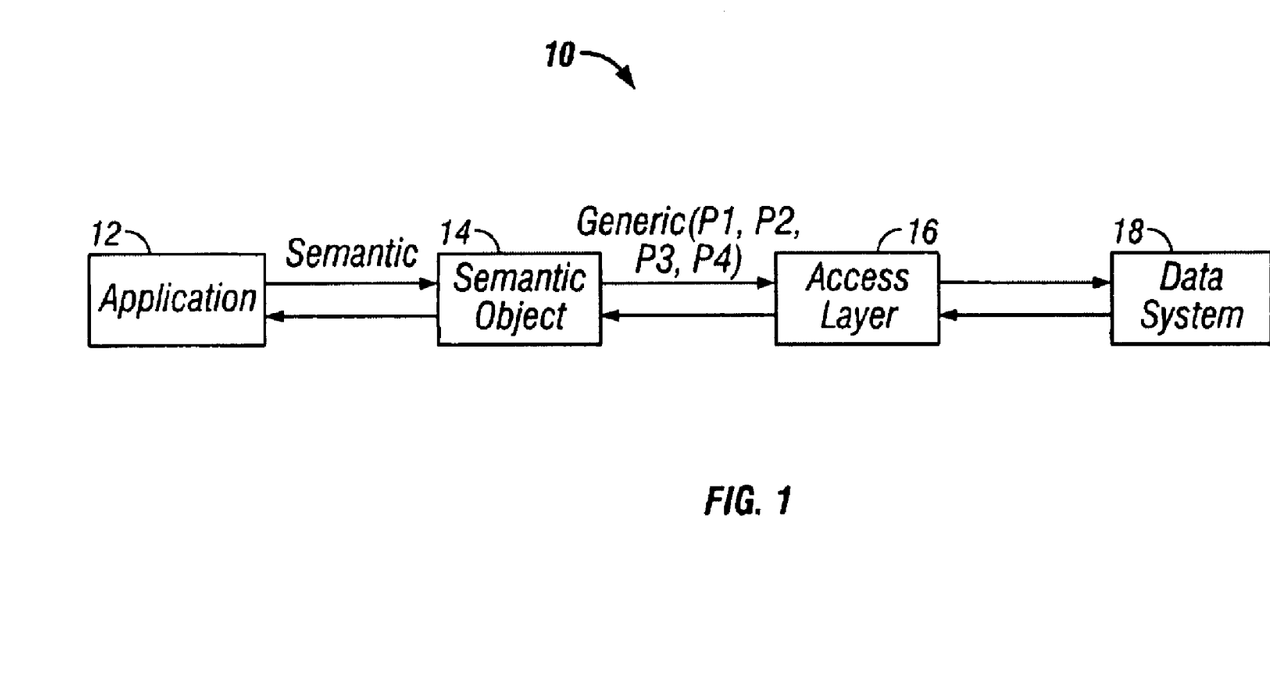
FIG. 1 is a block diagram of a system for managing data transfer between an application and a persistent data storage system.

FIG. 1 is a block diagram of a system 10 for managing data transfer between an application 12 and a persistent data storage system 18. In the pictured example, the application 12 could be any of a variety of computer applications, such as a component of an ERP system. From time-to-time, application 12 will have a need for data from persistent data storage system 18. In such a situation, the application 12 will generate a request for data. In a simple system, the application 12 may request the data directly from data system 18, so the request could be made in the protocol, or set of rules, that is understood by the the data system 18. However, in a complex system, such as an organization-wide ERP system, other components may be provided between the application 12 and the data system 18 so as to provide compatibility between the application 12 and the data system 18. As shown, communications occur in two directions between the components of the system 10; data requests are directed from left to right, while responses containing the data are directed from right to left.

Semantic object provider 14 is shown as receiving the data request from application 12 in the form of a semantic request. As described more fully below, the semantic request is in a format that indicates the nature of the data resource to which the application is seeking access. For example, if the data request relates to information about an employee of an organization, the semantic data request may take the form of "getUser." A request that would cause a database to be queried to obtain the name of an employee based on the employee's number could take the form of:

```
class Room {
    ...
    public IUser getAdministrator( )
    ...
}
```

The request may also contain a locational identifier for the data, such as a uniform resource identifier (URI). This identifier provides a unique address for the information that is being sought by the application. As with navigation using a Web browser and URL's, the application needs to know the identification or location of a starting object (such as a particular collaboration room). This starting object may be identified by a Resource ID (RID) that is a form of URI, and could, for example, be a parameter of a URL, such as "http://my-.portal.com/apps/room?rid=/rooms/Project3000Room."
Once the starting parameter is known, the application may move through the objects more easily, much like moving between various pages at a single web site. Discussion of the operation of URI's can generally be accessed from the Internet Engineering Task Force (www.ietf.org).

The appropriate semantic object of semantic object provider 14 may then interpret the semantic request and translate or convert it into an appropriate generic request to be processed by access layer 16. For example, where the semantic object is "GetUser," and the request seeks information about the user's name, as in the example above, the generic command could be phrased as follows:

Iresource r=ResourceFactory.getInstance( ).getResource ("/user/d-12345")
String s=r.getAttribute("FIRST_NAME")

And in actuality, much more information would need to be supplied by attributes, such as the attribute namespace, the attribute type, and the language locale.

As one can readily appreciate, this generic request is more complicated and less intuitive for a developer than is the semantic request. In particular, the generic request has a label that does not indicate the type of information that is sought by the request. Thus, by providing that the system, rather than the developer, provide this request, the system allows the developer to understand a programming environment much more easily. Also, the generic request has a number of parameters that are required to allow the data system 18 to locate the appropriate information. The semantic objects, in contrast, require little additional information. As a result, a developer using semantic objects can learn such a system more easily, will not have to type as much code, and will be less likely to make errors in the code.

Semantic objects provider 14 and its corresponding semantic objects may be made available as shared components of system 10. As such, they may be accessed by multiple different applications or portions of applications in system 10. For example, a CRM application that seeks access to employee information may be written to access semantic objects, while an application for establishing collaboration sessions among employees could also use the same objects. Also, although the semantic objects have been described as being related to a semantic object provider 14, the provider could be each of the semantic objects themselves.

Access layer 16 receives the request, determines the type of data system 18 on which the corresponding information is located, and makes the appropriate request for the data. This final request may be made by any number of different methods, and generally is not dependent on, nor does it affect, the manner in which the semantic object provider 14 operates.

When information has been read out of data system 18, it begins its trip to application 12. As with the request, the response may be transformed and translated as it is passed from component-to-component. For example, the response passed from data system 18 to access layer 16 may be provided in a format that is unique to the provider of the data system. The access layer 16 may translate the response into a generic format that is universal across multiple different data storage systems. This translation allows simplified communication from access layer 16 to semantic object provider 14. Finally, a semantic object from semantic object provider 14 receives the response and provides it to the application 12.

While this embodiment has been described as having four distinct components, system 10 may be arranged in any appropriate manner. For example, two or more of the components could be combined, or additional components could be provided. In addition, the order of, and interrelationships between, the various components could be rearranged. As one example, the responsive message would not have to follow a path through all of the components before reaching the application 12.

Figure 2:
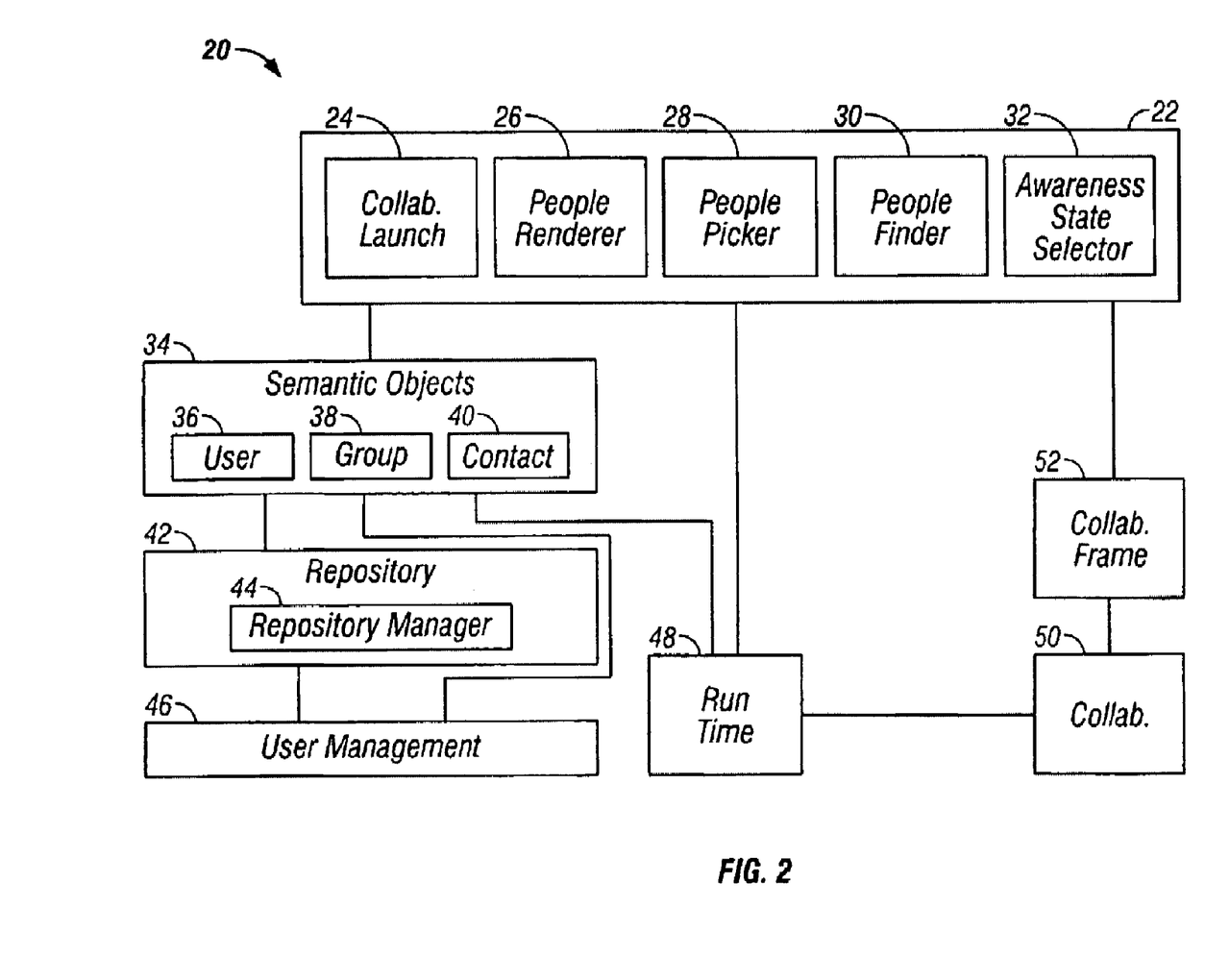
FIG. 2 is a block diagram of an system for providing collaboration services that access a data storage system.

FIG. 2 is a block diagram of a system 20 for providing collaboration services that access a data storage system. For example, the system 20 could be represented to a user as a communications portal or dashboard through which various communications services, such as e-mail, chat, virtual meetings, and virtual rooms, could be accessed. The system 20 provides, through applications to the user, a number of user interfaces 22. For example, a collaboration launchpad 24 may be provided as a central interface that allows a user to select participants and other objects to be associated with a collaboration session. For example, the user may select a number of co-workers to be associated with a virtual meeting, select a provider for the meeting, and send out invitations using the collaboration launchpad 24. People renderer 26 provides graphical displays associated with other users of the system with whom communication may occur. For example, a hyperlink of the person's name may be provided, along with an icon showing the person's current "awareness state," such as "on line," "in meeting," "away," or "on vacation,", and a pop-up menu that allows a user to set up a collaboration session with the other user. People picker 28 is an HTMLB control for conducting searches for people inside and potentially outside an organization, and may be implemented as a pop-up window. People finder 30 is an HTMLB control that can be accessed from different applications, and that uses people picker 28. Also, people picker 28 can be used to start the people finder 30 application. Awareness state selector 32 allows a user to select an awareness state that will be provided to members of an organization when they access their collaboration tools. In this manner, the other users can determine whether the first user is currently available for a communication session, such as a web chat or a spontaneous virtual meeting.

Semantic objects 34 are provided as part of an application programming interface (API) to user interfaces 22. In this embodiment, the semantic objects 34 include user object 36, group object 38, and contact object 40. User object 36 provides access to information regarding the users of system 20, i.e., the individuals who have network logins for system 22. Contact object 40 provides access to information regarding contacts, which are entities (typically individuals) with whom communication may be conducted. For example, the contacts may be thought of as entries in an on-line address-book for an organization. The contacts may include users, but may also include entities outside the organization. The group object 38 accesses information about groups of entities, such as e-mail distribution lists, members of virtual meetings and virtual rooms, and chat participants.

The semantic objects 34 may be provided to a developer as part of an ERP system or as part of an add-on for such a system. Alternatively, a developer could produce semantic objects, either from scratch, or by building upon existing objects or libraries of objects. Also, various additional semantic objects 34 may be made available for access, such as by remote on-line access (e.g., through the Internet) or from third-party providers.

Semantic objects 34 may request access to information through repository 42, which may employ a repository manager 44. A repository framework provides for the abstraction of various items in a persistence layer, so as to assist in integrating various kinds of persistence systems (e.g., file systems, databases, LDAP, and R/3). A new persistent storage system can be integrated into the main system by implementing a repository manager that is configured to work with that particular persistent storage system (e.g., a Lotus Notes repository manager). Repository 42 can comprise any appropriate system or subsystem for managing data, whether in highly organized form or in less-organized form. Repository 42 in turn communicates with user management 46, which can be any appropriate backend system whose responsbility is to store and organize user-related information. User management 46 can, for example, define data structures for users and for the roles of users in a system, and is responsible for tracking user actions and states, such as user login and access rights.

User object 36 comprises the software representation of a user that is logged onto the system 20. The object may be used to access information that is typically stored within the user management 46 system. The application may use the user object 36 to check access rights (e.g., whether a particular user can view a particular document), and the application generally displays details of this object, such as the user name. The object generally asks the repository framework resource for its attributes, and receives back the attributes, such as by primitive data types (e.g., strings integers, or floating point numbers).

The group object 38 is a collection that returns a list of users, and the application can then display the list. The repository framework may store a special resource known as a collection, and the group object 38 may obtain access to this resource. The group object 38 can be analogized to directories in a file system that manages various files.

Contact object 40 is a specialization of the user object. It provides the same information as a user object, but has a different semantic meaning. Generally, a contact is an external user (such as an employee at a partner company), while a user is someone who has physical access to the portal system. A contact may be provided with a login state that is always false.

Other components of system 20 provide the functionality through which the user interfaces 22 can operate. For example, collaboration framework 52 provides access to a number of collaboration services 50. Framework 52 may provide services to allow the scheduling and launch of collaboration sessions, to allow connection to a disparate range of collaboration services (and to limit access to particular services depending on the participants in a session and their individual access rights and abilities). In addition, framework 52 may provide for the tracking and auditing of collaboration sessions, so, for example, information about sessions (e.g., transcripts of chat sessions, documents that are used or edited in a virtual meeting, or audio or video files) are properly stored and indexed so that they can be located and used later.

Portal runtime 48 is the environment in which the portal applications may operate. For example, the lowest runtime may be a VM, or Java virtual machine (where Java is used to implement the portal). The next level may be the J2EE engine, which is the application server that operates like a VM application. The third level may be a J2EE engine service. The various other applications may then be deployed as services to the portal.

Figure 3:
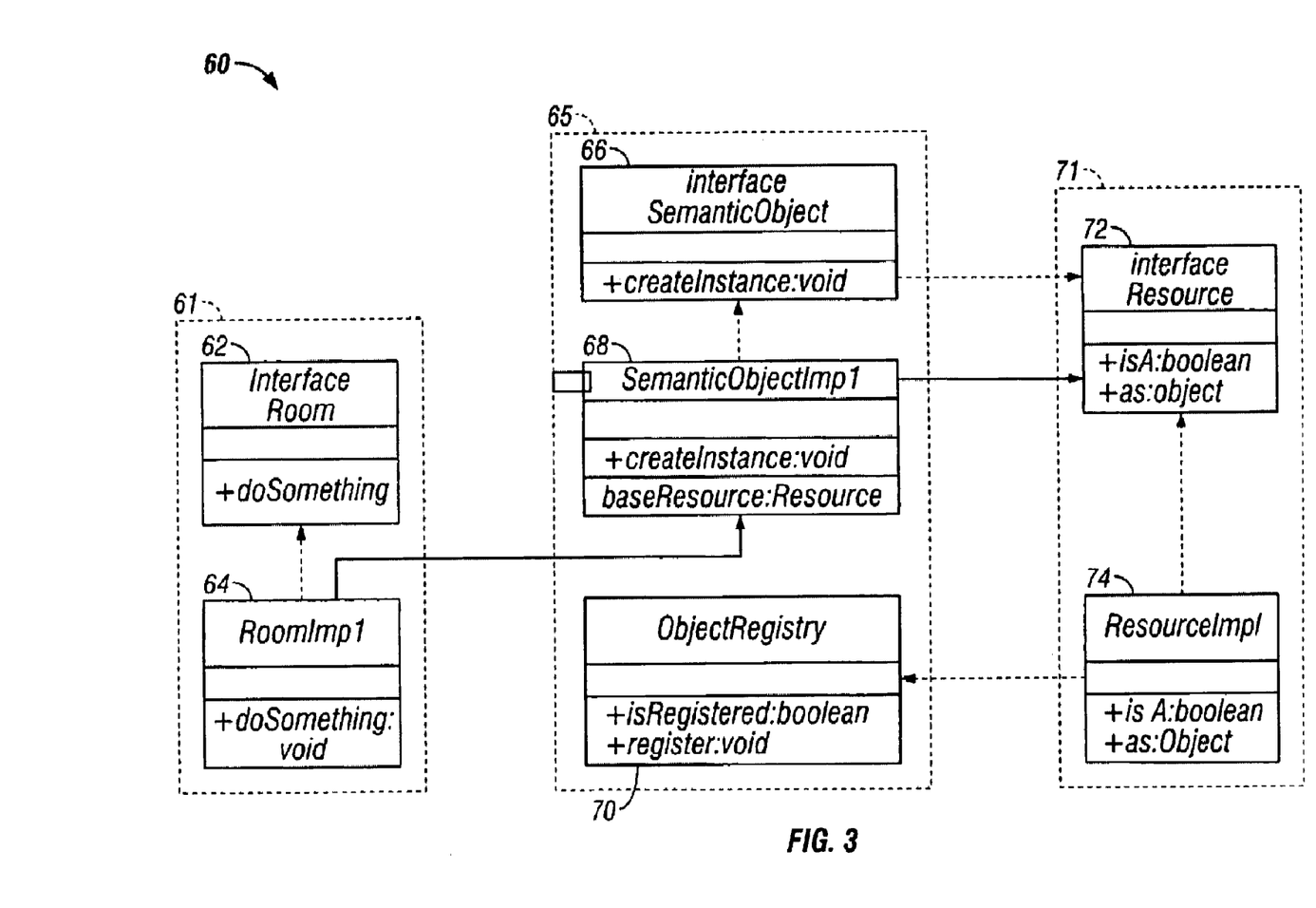
FIG. 3 is a class diagram for a system that provides collaboration services in the form of a virtual room.

FIG. 3 is a class diagram for a system 60 that provides collaboration services in the form of a virtual room. The classes are organized by the component that implements them: the collaboration application 61, the semantic object provider 65, and the repository framework 71. From the application 61, the Room class 62 provides an interface that allows users to access a virtual room; as one example, the Room class has an operation, "dosomething", that performs an operation for providing interaction with a room. The RoomImpl class 64 is derived from the Room class 62. It implements the room interface and maps attributes to the room resource, including by implementing the "dosomething" operation. The RoomImpl class 64 can also store temporary state information about the room.

The semantic object provider 65 implements the Semantic Object class 66, which defines an application programming interface for creating and working with semantic objects. The semantic object implementation class 68 is derived from the semantic object class 66. It takes the "create instance" attribute, and performs the "baseResource" operation to store information relating to the class persistently. The room implementation class 64, provided by the application, is derived from the semantic object implementation class 68, and provides generic functionality that is implemented in the semantic object base class. The semantic object provider 65 also implements an object registry 70, which interacts with classes implemented by a repository framework 71, as described below.

The repository framework 71 implements a resource 72, which defines an interface for receiving requests for information stored in a persistent data storage system. The resource class 72 defines objects having generic interfaces for interacting with the storage system (e.g., get/setAttribute, lock/unlock, and rename). In addition, the repository framework 71 implements a resource implementation 74, which is derived from the resource class 72 and from the object registry 70 that is implemented by the semantic object 65. The implementation maps or converts a semantic attribute (e.g., first name) to a generic attribute (e.g., getAttribute("FIRST NAME")). The object registry 70 maps information between the room interface and the database table (or other storage).

As shown, the connection between the semantic object class 66 and the resource class 72 may be implemented once centrally, such as the first time that an application needs access to a particular group of information. The connection to the resource may then be maintained, so that the application (or applications) do not need to repeatedly make the connection. For example, the application may start with a generic resource object by asking a resource factory the following:

IResource r=ResourceFactory.getInstance( ).getResource (myRID)

The resource, when obtained, may then be cast to a semantic object, as follows:

ImyObject o=(ImyObject) r.as(ImyObject)

The resource is then responsible for creating the semantic object instance. In the constructor, the resource can set itself as a return pointer.

Objects may also be type cast with the system. For example, the semantic object mechanism can create a new object from a resource that is of a different type (such as using the as( ) method in FIG. 6). Other type cast mechanisms, such as the standard Java type cast, can also be used.

Figure 4:
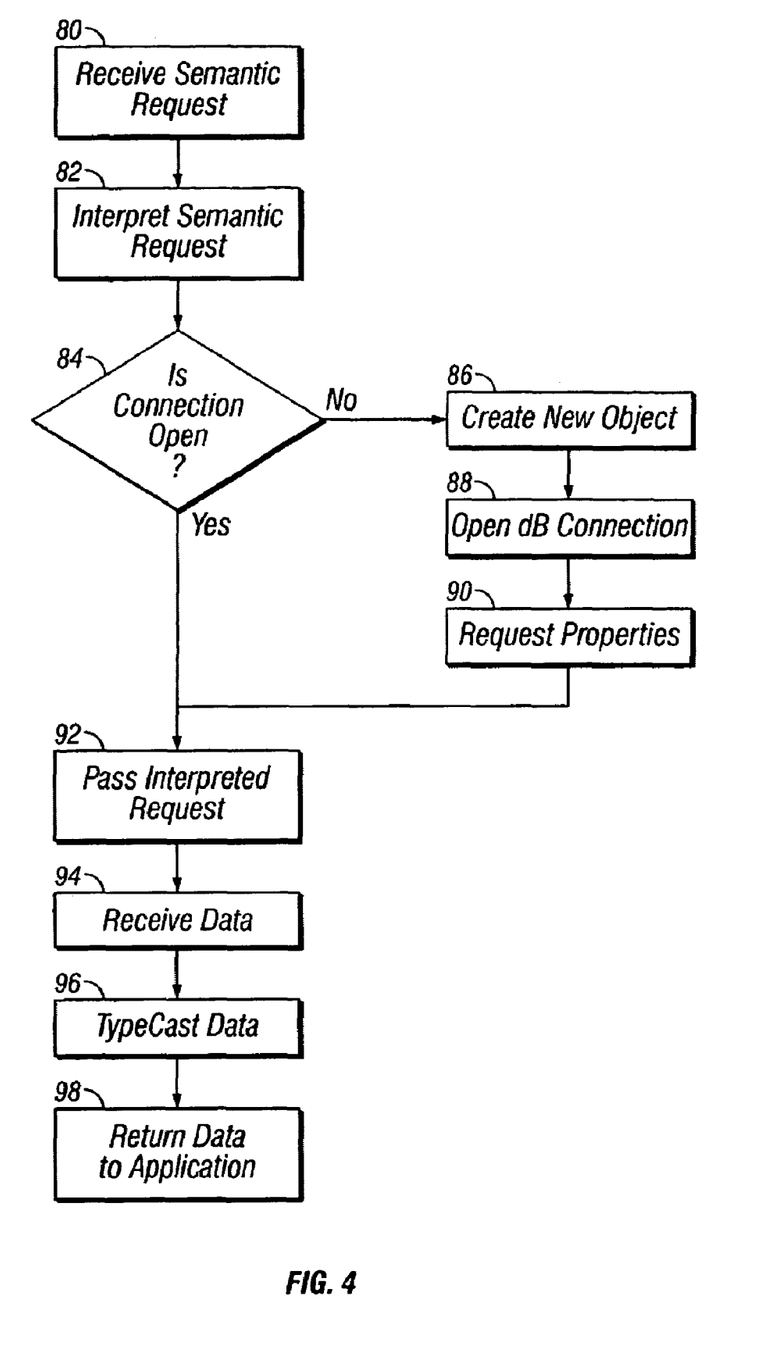
FIG. 4 is a flowchart of a process performed by a semantic object provider.

FIG. 4 is a flowchart of a process performed by a semantic object provider. At box 80, the provider receives a request in a semantic form from an application. The provider interprets the request at box 82, and determines at box 84 whether a connection to the appropriate data storage system or systems relating to the request have been opened. If they have not, the provider creates a new empty semantic object that corresponds to the semantic request (box 86). The semantic object then opens a connection to the data storage system (box 88), such as a database, and can generally make the connection with the assistance of an access layer, as described above. With the connection open, the semantic object requests the properties of the corresponding resource in the data storage system or systems (box 90).

Once these steps have occurred, or if a connection has already been established, the provider may then pass the interpreted or converted request to a repository (box 92). For example, while the incoming request could be in a semantic format, the outgoing request will be in a more generic format, with parameters that specify the required processing that is only implicit in the semantic request. Also, although the interpretation of the request is shown as occurring before the determination of whether a connection is open, the interpretation could occur after the determination, and the request could be partly interpreted (such as to determine its associated object) before the determination, and partly interpreted after.

After passing the request on, the semantic object waits for a response containing data. The semantic object or semantic object provider may receive the data (step 94), and if the data has been provided in a type that differs from the requirements of the requesting application, the semantic object can type cast the data (step 96) so as to provide it with the appropriate format for the application. At this point, the semantic object may pass the data to the application (step 98).

Figure 5:
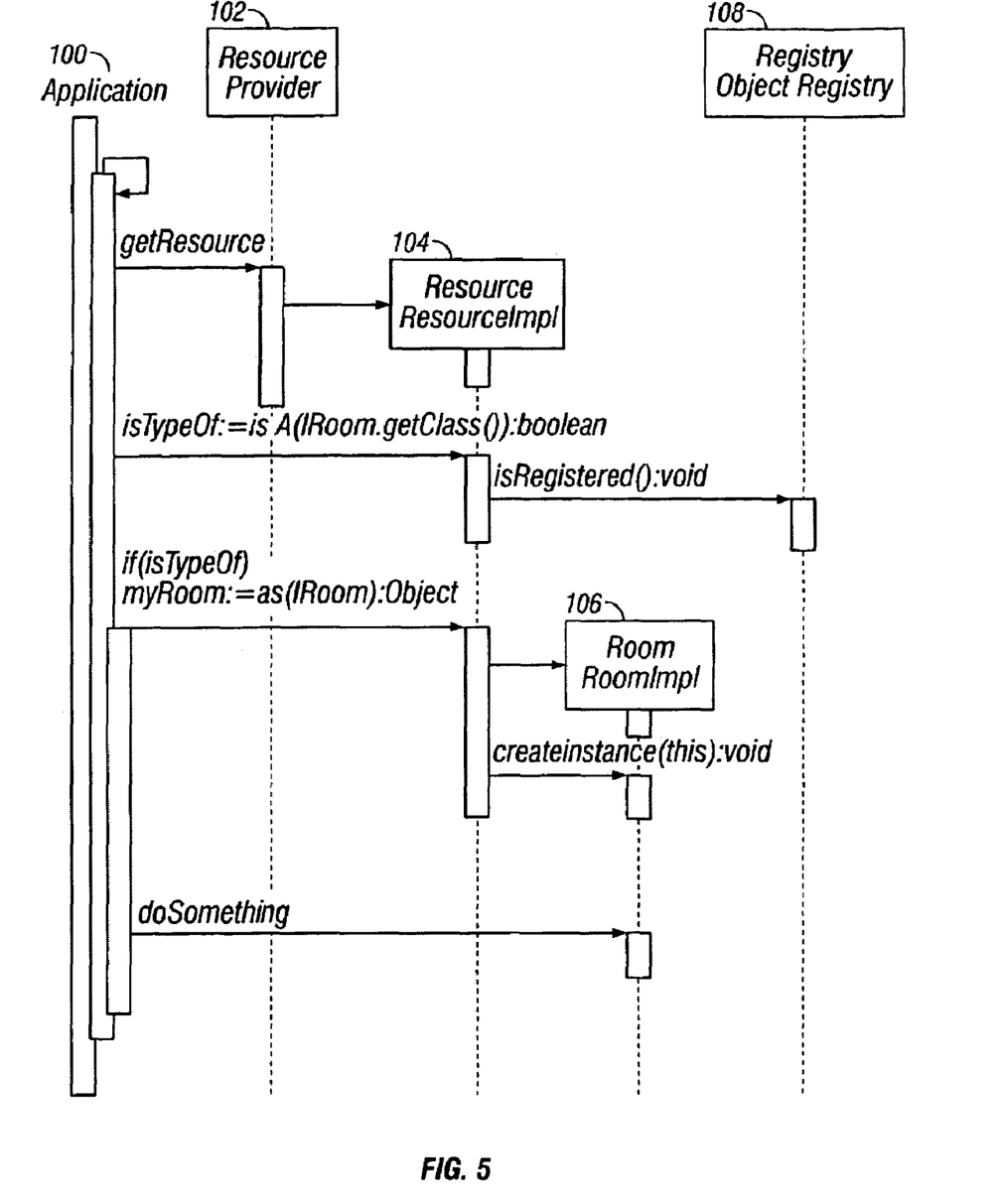
FIG. 5 is an interaction diagram showing steps that may be performed to provide an application with access to a stored resource

FIG. 5 is an interaction diagram showing steps that may be performed to provide an application with access to a stored resource. The application 100 first self-delegates by calling a method of the application itself that in turn uses the semantic object mechanism. The application 100 then sends a "getResource" message to the resource provider 102, and causes the creation of a resource implementation object 104. This provides a resource as a starting point for the semantic object. Application 100 may then send a "is TypeOf" message to the resource implementation object 104, to check it to make sure it is the appropriate type of resource, so that it can be cast. If the resource is not the correct type, the response may be an error. The relation between a resource type and supported interfaces for that resource may be stored in the object registry 108. Application 100 may also send a message particularly related to a virtual room, and the resource implementation 104 may then create a room implementation 106, and create an instance relating to the room implementation 106. The "doSomething" message simply indicates that any method may be used, such as print( ).

Figure 6:
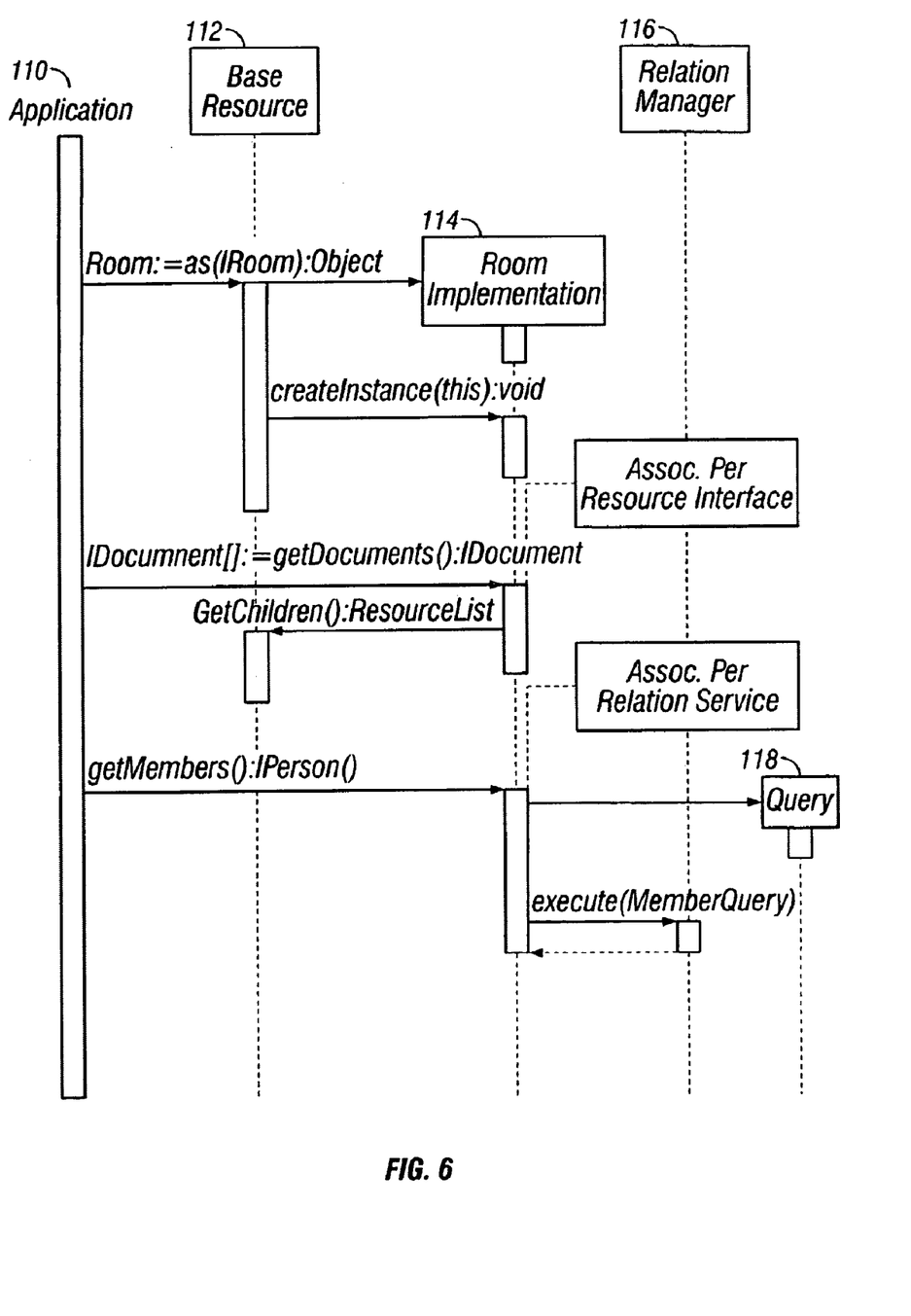
FIG. 6 is an interaction diagram showing steps that may be performed to establish a semantic object and retrieve data using the object.

FIG. 6 is an interaction diagram showing steps that may be performed to establish a semantic object and retrieve data using the object. Application 110 first seeks to access information about a virtual meeting room, and sends a request to base resource 112, which in turn opens a new room implementation object 114. Base resource then creates an instance; the base resource has a default implementation that makes a lookup in the semantic object registry and creates an object of the registered type. Application 110 can later seek information about a document that is associated with the room simply by making a semantic request for it. In particular, the room may be provided with a directory that can reference documents and other objects associated with the room. Each document or other such object is a child of the directory. In a like manner, the members of a group (e.g., those entities that have access to the virtual room) can be queried using the room implementation 114. For example, a call of getMember( ) may be made, which is more intuitive and simpler than making a complex query to get the members. The query is implemented once within the semantic object implementation, and thereafter the call can be made.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though a portal, but any of a number of access systems and methods may be used to manage collaboration sessions. The logic flows depicted in FIGS. 4-6 do not require the particular order shown, or sequential order, to achieve desirable results. Other embodiments may be within the scope of the following claims.

What is claimed is:

1. A computer-implemented method of providing access to information stored in diverse formats, the method comprising:
   receiving from an application a semantic request having a request name that semantically identifies a type of information sought by the request, the semantic request comprising a uniform resource identifier;
   converting, at a semantic object provider, the received semantic request to a generic request having corresponding request parameters, the semantic object provider comprising a semantic object class defining an application programming interface to create an object, a semantic object implementation class to provide persistency to information related to a class, and an object registry to interact with a class implemented by a repository;
   initiating, by the semantic object provider, a creation of the object for receiving and converting the semantic request;
   opening a database connection within a data access system corresponding to the semantic request;
   requesting properties of data corresponding to the semantic request, if a database connection has not previously been opened;
   transmitting the converted request to the a data access system;
   receiving data from the data access system corresponding to the converted request; and
   providing the data to the application.

2. The computer-implemented method of claim 1, further comprising typecasting the data received from the data access system before providing the data to the application.

3. The computer-implemented method of claim 1, wherein the object is a group object configured to access information about groups of entities.

4. The computer-implemented method of claim 1, wherein the created object requests the properties of a resource corresponding to the converted request.

5. The computer-implemented method of claim 1, wherein the converted request comprises parameters corresponding to, but not present in, the semantic request.

6. An article comprising a tangible machine-readable medium storing instructions operable to cause one or more machines to perform operations comprising:

receiving from an application a semantic request having a request name that semantically identifies a type of information sought by the request, the semantic request comprising a uniform resource locator;

converting, at a semantic object provider, the received semantic request to a generic request having corresponding request parameters the semantic object provider comprising a semantic object class defining an application programming interface to create an object, a semantic object implementation class to provide persistency, and an object registry to interact with a class implemented by a repository;

initiating, by the semantic object provider, a creation of the object for receiving and converting the semantic request;

opening a database connection within a data access system corresponding to the semantic request;

requesting properties of data corresponding to the semantic request, if a database connection has not previously been opened;

transmitting the converted request to the data access system;

receiving data from the data access system corresponding to the converted request; and     providing the data to the application.

7. The article of claim 6, further comprising instructions operable to cause one or more machines to typecast the data received from the data access system before providing the data to the application.

8. The article of claim 6, wherein the object is a group object configured to access information about groups of entities.

9. The article of claim 6, wherein the created object requests the properties of a resource corresponding to the converted request.

10. The article of claim 6, wherein the converted request comprises parameters corresponding to, but not present in, the semantic request.

\* \* \* \* \*

UNITED STATES PATENT AND TRADEMARK OFFICE
CERTIFICATE OF CORRECTION

PATENT NO.         : 7,577,682 B2
APPLICATION NO. : 10/632120
DATED              : August 18, 2009
INVENTOR(S)        : Stefan Mueller et al.

It is certified that error appears in the above-identified patent and that said Letters Patent is hereby corrected as shown below:

On the Title Page

Item (54) please correct the title from Semantic Objects to Semantic Objects For Data Access Signed and Sealed this Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,577,682 B2  Page 1 of 1
APPLICATION NO. : 10/632120
DATED : August 18, 2009
INVENTOR(S) : Stefan Mueller et al.

It is certified that error appears in the above-identified patent and that said Letters Patent is hereby corrected as shown below:

On the Title Page, Item (54) and Column 1, line 1,

Please correct the title from Semantic Objects to Semantic Objects For Data Access This certificate supersedes the Certificate of Correction issued October 27, 2009.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,577,682 B2  
APPLICATION NO. : 10/632120  
DATED : August 18, 2009  
INVENTOR(S) : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Seventh Day of September, 2010

David J. Kappos  
*Director of the United States Patent and Trademark Office*